Patented Nov. 24, 1936

2,062,080

UNITED STATES PATENT OFFICE 2,062,080

METHOD OF PREVENTING BLOOMING OF ROOFING GRANULES

Stephen G. Wright, Chicago, Ill.

No Drawing. Application January 23, 1935, Serial No. 3,140

5 Claims. (Cl. 91—70)

This invention relates to a method of preventing blooming of roofing granules, and particularly of low temperature burned sodium silicate coated granules.

The problem of blooming has long been recognized in the roofing industry, although its cause is not entirely clear.

Certain types of materials will accumulate a coating of whitish powdery substance on the surface, presumably due to the solution of soluble constituents of the material in water, such as rain, and subsequent re-precipitation of these constituents on the surface.

This problem is particularly aggravating in the case of roofing granules which have been coated with sodium silicate, and baked at a temperature below a fixing temperature. Under normal conditions a temperature of the order of 1500° F. or more is required to render sodium silicate entirely insoluble, although this temperature may be very considerably less under special operating circumstances. When, either because of the type of granules used, or because of the pigment, or for some other reason, it is inexpedient or impossible to use a fixing temperature for the silicate, the problem of blooming is almost invariably encountered.

For example, pigment such as cadmium sulfide (CdS) and lead chromate ($PbCrO_4$) used in the production of buff or yellow granules could not be heated above 1100 or 1200° F., and therefore granules treated with these coloring materials and sodium silicate bloom badly.

It has now been discovered that this difficulty may be overcome by treating the granules, after burning, with a small quantity of nitric acid. The nitric acid in dilute form is simply poured upon the granules, upon which it spreads like oil, and the amount used is such that it dries almost immediately. No further treatment is necessary. With the said treatment it is possible to burn the granules at temperatures of 1100–1200° F., or even as low as 600° F., and still have a non-blooming fixed glaze or coating. In fact, the purpose of the "burning" appears to be simply to dry the material.

As an example of the invention, roofing grit, such as crushed trap rock, rhyolite, or the like, is treated with a solution of sodium silicate in which pigment such as cadmium sulfide, lead chromate, or other suitable pigment has been incorporated. A satisfactory amount of silicate solution is 2 ccs. of water to 3½ ccs. of 40° Bé. sodium silicate solution of the ordinary commercial type. With this is mixed the desired amount of pigment, and the mixture applied to 200 gms. of grit. This is at the rate of about 3 gallons of water and 4¾ gallons of sodium silicate per ton of rock. For absorbent rock such as brick or shale larger quantities of the solution may be used.

The sodium silicate-pigment mixture is applied to the granules which are tumbled and then burned. The burning temperature may be any suitable temperature, but as hereinbefore set forth, the nitric acid treatment makes very low burning temperatures possible.

After burning, the granules are treated with nitric acid. A suitable concentration of acid may be produced by using 3 parts of water and 1 part of 36° Bé. nitric acid (54%). The resulting 13½% acid is applied at about the rate of three gallons to one ton of rock such as trap or rhyolite.

The acid may be simply poured on the rock granules and the latter tumbled. The acid spreads like oil, although the amount is so little that the rock is hardly wet, and the granules dry immediately without special treatment.

Following such treatment no blooming occurs, but the mechanism of the fixation is not understood.

The invention may be used whether the silicate forms a complete or only a partial coating, and the term "coating" as used herein covers either type.

The foregoing detailed description has been given for clearness of understanding only, and no unnecessary limitations should be understood therefrom, but the appended claims should be construed as broadly as permissible in view of the prior art.

What I claim as new and desire to secure by Letters Patent is:

1. In the production of roofing granules, the steps of coating said granules with a solution of sodium silicate, burning said coated granules at a temperature below a fixing temperature, and treating the granules with a dilute nitric acid solution in such amounts that the granules are hardly wet and dry immediately.

2. The method as set forth in claim 1 in which the burning temperature is of the order of 1100 to 1200° F.

3. The method as set forth in claim 1 in which the acid is supplied at the rate of three gallons of 13.5% acid per ton of non-absorbent rock.

4. The method as set forth in claim 1 in which the sodium silicate is supplied at the rate of 4¾ gallons of 40° Baumé sodium silicate per ton of non-absorbent rock, and the amount of acid is of the order of three gallons of 13.5% acid per ton of said rock.

5. A roofing granule having a coating thereon containing a heat sensitive pigment and a sodium silicate coating produced by covering the granule with a solution of sodium silicate and burning below a fixing temperature, and then treating the granule with a dilute nitric acid solution in such amount that the granule is hardly wet and dries immediately.

STEPHEN G. WRIGHT.